United States Patent [19]

Tsunekawa et al.

[11] Patent Number: 4,470,685
[45] Date of Patent: Sep. 11, 1984

[54] INTERMEDIATE ADAPTER

[75] Inventors: Tokuichi Tsunekawa, Kanagawa; Yuichiro Konishi, Tokyo, both of Japan

[73] Assignee: Canon Kabushiki Kaisha

[21] Appl. No.: 426,950

[22] Filed: Sep. 29, 1982

Related U.S. Application Data

[63] Continuation of Ser. No. 114,209, Jan. 22, 1980, abandoned.

[30] Foreign Application Priority Data

Jan. 26, 1979 [JP] Japan ............................ 54-8584

[51] Int. Cl.³ ............................................. G03B 15/05
[52] U.S. Cl. .................................... 354/416; 354/431
[58] Field of Search ................... 354/23 R, 33, 55, 56, 354/31, 35, 54, 59, 416, 417, 431, 480

[56] References Cited

U.S. PATENT DOCUMENTS 3,726,197  4/1973  Hasegawa et al. ............... 354/33 X
4,172,646 10/1979  Matsumoto ........................... 354/56
4,178,084 12/1979  Matsumoto et al. ................ 354/59

FOREIGN PATENT DOCUMENTS

2021180 11/1971  Fed. Rep. of Germany ........ 354/33

Primary Examiner—William B. Perkey
Attorney, Agent, or Firm—Toren, McGeady and Stanger

[57] ABSTRACT

Disclosed is an intermediate adapter to be used between the camera body and the photographing lens during close-up photography. A light beam splitter in the adapter housing projects part of the light from the lens to a sensor to produce an electric signal. An illumination device that lights a subject to be photographed is controlled by the signal produced by the light split by the light beam splitter. The beam splitter includes a diffraction arrangement that directs a portion of the light from the path to the film.

2 Claims, 14 Drawing Figures

INTERMEDIATE ADAPTER

This is a continuation of Ser. No. 114,209 filed Jan. 22, 1980, and now abandoned.

FIELD OF THE INVENTION

The present invention relates to an intermediary adapter device with a light beam splitter, particularly a holographic beam splitter.

Description of the Prior Art

Since TTL light measurement has become possible for a single lens reflex camera, close-up photography has become very convenient as compared with the age of external light measurement. However, in close-up photography the effective F. No. of the lens becomes large in connection with the photographing magnification factor so that for daylight photography the shutter time is apt to be long. This produces the danger of blurring the picture if the camera could not be held firmly long enough. Further, in case of out-door photography a chance to use the slow speed shutter is often lost due to atmospheric conditions such as the existence of wind, which may move the subjects being photographed. Under such circumstances quite recently the artificial light source such as an electronic flash or speed light has often been used even for close-up photography in order to allow a high speed shutter. On the other hand, if a speed light (electronic flash) is used, the light is usually emitted at a moment when the leading shutter curtain has run after the mirror has been raised with the shutter release, namely, when the shutter has been totally opened. Thus the position at which the light is measured is quite limited if one is to automatically adjust the amount of the emitted light with a TTL light measuring system.

Figure 1:
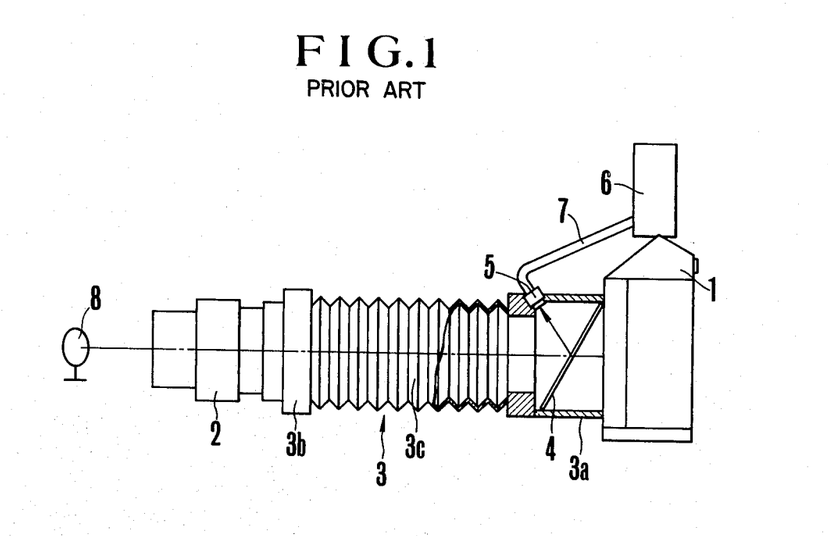
FIG. 1 shows the conventional intermediary adapter mounted on a camera.

Proposals have been made to use a half permeable mirror in the close-up adapter that connects the camera body with the photographing (photographic) lens and to measure the photographic light striking the half permeable mirror in order to control the amount of the light emitted from the speed light device. This is shown in FIG. 1, which illustrates a camera body 1, a photographing lens 2, a close-up adapter 3 for connecting the camera body 1 with the photographing lens 2, and a speed light device or electronic flash 6 mounted on the camera body 1. The adapter 3 has a camera body connecting part or body connector 3a, a photographing lens connecting part or lens connector 3b and bellows 3c therebetween. Within the connecting part 3a a half permeable mirror 4 is mounted at an angle while a light measuring sensor 5 is positioned to pick up image light reflected by the half mirror 4. The light sensing element 5 is connected to the light adjusting circuit of a speed light device or electronic flash 6 through the cable 7.

In the above embodiment, when the speed light emits light at the time at which the leading shutter curtain has run after the mirror in the camera body 1 has been raised along with the shutter release, the light reflected from the object 8 strikes the film in the camera body 1 through the photographing lens 2 and the adapter 3. A part of the reflected light is reflected by the half permeable mirror 4 provided in the connecting part 3a of the adapter 3 so as to strike the light senseing element 5 such that the amount of the light emitted by the speed light device 6 is controlled by the light adjusting circuit therein in accordance with the output of the light sensing element 5.

On the other hand, in case the half permeable mirror 4 for picking up the light to be measured is angularly mounted in the adapter 3, the adapter 3 has to be correspondingly large in order to cover all of the effective light beam coming through the photographing lens 2 as well as to maintain the proportionality to the F. No. of the lens. Hence, the total length of the adapter 3 is unavoidably large when the bellows 3c is folded up because of the angularly mounted half permeable mirror 4. Thus, the larger the total length of the adapter 3, the larger is the advance amount of the lenses so that the photography with low magnification factor is especially difficult. This is disadvantageous. Consequently, it is preferable for the sake of this and other applications and as a camera accessory that the total length of the adapter be as small as possible while the adapter itself be as compact as possible.

Summary of the Invention

An object of the present invention is to offer an intermediate adapter having a light beam splitter in the path of the light reflected from an object illuminated by a flash unit, wherein a part of the reflected light is directed out of the optical path and measured so as to form a control signal for a light adjusting circuit in the flash unit.

Another object of the present invention is to offer an intermediate adapter device which is more compact and shorter than that having a conventional half permeable mirror mentioned in the description of the prior art.

According to a feature of the invention, such a device uses a light beam splitter in the form of a hologram beam splitter.

In the intermediate adapter device in accordance with the present invention a housing device holds an optical member including a light permeable plate having surfaces parallel to each other and in the path of light coming from the object or reflected from the film surface and one surface of the glass plate is provided with the diffraction grating which diffracts a part of the light out of the photographic optical path so that the amount of light is measured. This device measures the light reflected from the object illuminated with the flash such that the light adjusting circuit of the flash light device is controlled so as to obtain a proper exposure.

Still another object of the present invention is to control the unit adjusting circuit of the flash unit by leading the light reflected from the light sensitive surface such as film surface by making use of the effect of the diffraction gratings of the above intermediatery adapter device out of the optical path and measuring it.

DESCRIPTION OF THE PREFERRED EMBODIMENTS

Figure 2:
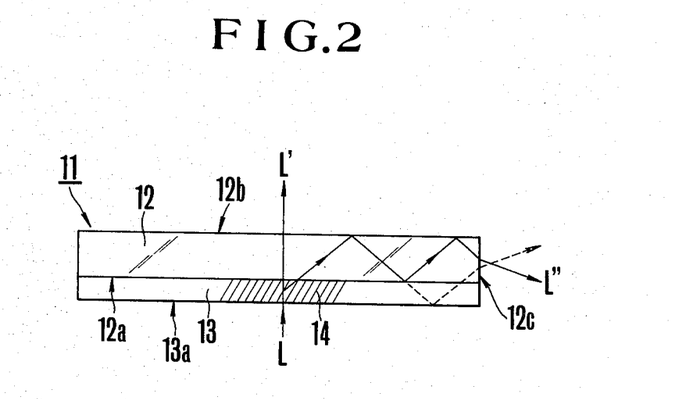
FIG. 2 shows a diffraction means to be used for the intermediary adapter device in accordance with the present invention.

FIGS. 2 and 3 show embodiments of a light splitter composed of diffraction means and capable of being used in the intermediate or intermediary adapter device in accordance with the present invention. A light beam splitter 11 in FIG. 2 includes a glass plate 12 forming forming base and an emulsion layer 13 provided on the surface 12a of the glass plate 12. In the emulsion layer 13 a diffraction grating pattern 14 is formed as is shown with oblique lines in the drawing. The diffraction grating pattern 14 is formed such that the diffraction effect directs a part L" of a light beam L incident on the pattern 14 at right angles out of the pattern toward the other surface 12b of the glass plate 12 at the angle at which the part L" is reflected on the surface 12b, namely at the critical angle. Consequently, the diffracted light L" is reflected several times between the surfaces 12b and 12a of the glass plate 12 and goes out of the end surface 12c. Thus, the incident light beam L is divided into the passing light L' and the diffracted light L". According to one embodiment, the refractive index of the emulsion layer 13 is higher than that of the glass plate 12, the diffracted light L" enters the emulsion layer 13 and is reflected on the surface 13a as is shown by a broken line depending upon the incident angle of the diffracted light L" on the surface 12a of the glass plate 12.

Figure 3A:
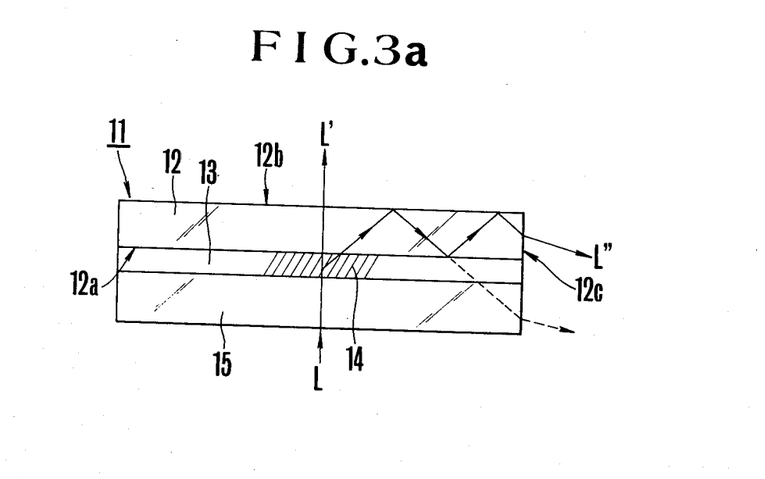
FIG. 3a shows the light beam splitter.

FIG. 3a shows an embodiment different in construction from that shown in FIG. 2, namely a sandwich construction. In FIG. 3a the emulsion layer 13 is sandwiched between the glass plate 12 and a cover glass plate 15. In the same way as in FIG. 2, the light beam L striking on the diffraction grating pattern 14 through the glass plate 15 at the right angle is divided into passing light L' and diffracted light L" by means of the diffraction grating pattern 14. The diffracted light L" is reflected several times between the surfaces 12b and 12a of the glass plate 12 and goes out from the end surface 12c. Even in the above construction, when the refractive index of the cover glass plate 15 is larger than that of the emulsion layer 13, the diffracted light L" enters into the emulsion layer 13 and the glass plate 15 as is shown by a broken line depending upon the incident angle of the diffracted light L" on the surface 12a of the glass plate 12. Hereby, in the embodiment of FIG. 3a, the oxidation of the emulsion layer 13 and the variation of the diffraction effect of the diffraction grating pattern 14 due to the change of humidity can effectively be avoided by the covering glass plate 15.

Figure 3B:
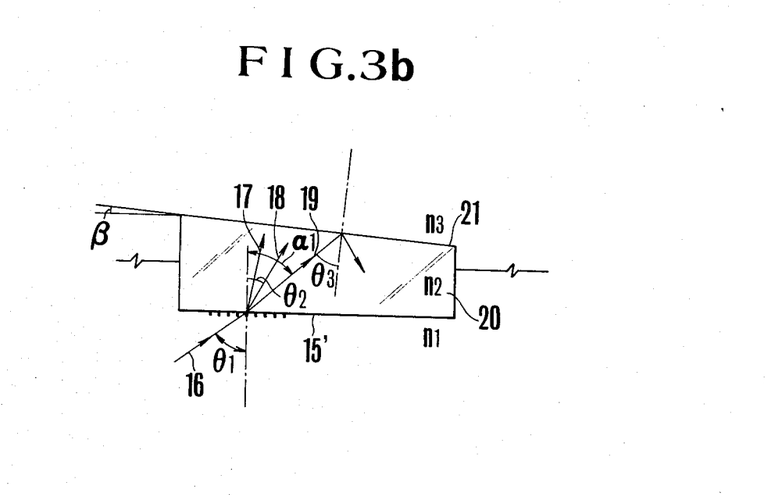
FIG. 3b shows the explanation drawing of the light beam splitter for the present invention.

Below the principle and the operation of the light beam splitter will be explained below in accordance with FIG. 3b to FIG. 3d. In the drawing, a prism 20 forms a totally reflecting surface 21, a prism surface 15' having a diffracting grating. An incident light beam 16 coming from the outside of the prism produces a − first order diffracted light beam 17, a 0 order diffracted light beam 18 and a + first order diffracted light beam. When the light beam 16 strikes the prism surface 15' having the diffracting grating construction, the light beam is divided into three orders, namely the − first order diffracted light 17, the 0 order diffracted light 18 and the + first diffracted light 19. Hereby, the 0 order diffracted light is diffracted along the direction given by the following relation.

$$\theta_2 = \sin^{-1}\left(\frac{n_1}{n_2}\sin\theta_1\right). \tag{1}$$

Further, the ± order diffracted light is diffracted along the direction given with the following relation.

$$\alpha\pm = \theta_2 \pm \sin^{-1}\left(\frac{\lambda}{n_2 p}\right). \tag{2}$$

Here, $n_1$ is the refractive index of the medium through which the incident light beam 16 travels, while $n_2$ is that of the prism medium 20.

Further, $\theta_1$ is the incident angle of the light beam 16, $\theta_2$ the refraction angle of the 0 order diffracted light, $\lambda$ the wave length of the light beam 16, p the pitch of the diffraction grating, $\alpha+$ the diffraction direction of the + first order diffracted light and $\alpha-$ the diffraction direction of the − first order diffracted light.

Now the + first order diffracted light 19 strikes the totally reflecting surface 21 at the angle $\theta_3$ given by the following relation.

$$\theta_3 = \alpha+ - \beta \tag{3}$$

Here, $\beta$ is the inclination of the surface 21 to the surface 15'.

The condition under which the light beam 19 is totally reflected on the surface 21 is as follows.

$$\theta_3 > \sin^{-1}\left(\frac{n_3}{n_2}\right) \quad (n_2 > n_3). \tag{4}$$

Here, $n_3$ is the refractive index of the medium outside of the prism in contact with the surface 21.

The relations (1) and (3) are applied to the relation (4), from which the following relation is obtained.

$$\sin^{-1}\left(\frac{n_1}{n_2}\sin\theta_1\right) + \sin^{-1}\left(\frac{\lambda}{n_2 p}\right) - \beta > \sin^{-1}\left(\frac{n_3}{n_2}\right). \quad (5)$$

Consequently, it is possible to lead the light beam to the totally reflecting prism surface from the outside of the prism, by properly selecting the refractive indexes $n_1$, $n_2$ and $n_3$ of the medium, the pitch of the diffraction gratings, the incident angle $\theta_1$ to the prism and the inclination $\beta$ in such a manner that the relation (5) is fulfilled.

For example, when the prism is parallel plates while the light beam is incident at the right angle, namely $\theta_1 = 0$ and $\beta = 0$, the following relation is obtained from (5).

$$p < (\lambda/n_3) \quad (6)$$

Consequently, in this case it is possible to take the light beam into the prism by making use of the diffraction gratings having the pitch given with the relation (6).

When $\theta_1 = 45°$, $\beta = 0$, $n_1 = n_3 = 1$, $n_2 = 1.5$ and $\lambda = 5000$ Å as another example, $\beta < 1.44$ μm is obtained. In consequence, it is possible to direct the light beam which is totally reflected to the totally reflecting surface from the outside of the parallel plate by providing the incident surface of the parallel plate with the diffraction grating construction of a pitch about 1 μm.

The diffracting gratings in the above explanation is of plane construction so that the amount of the 0 order diffracted light is largest, while it is desirable that the amount of the + first order or the − first order diffracted light should be largest in order to make the most effective use of the amount of the incident light so that it is recommended that the diffraction gratings should be of three dimensional construction.

Figure 3C:
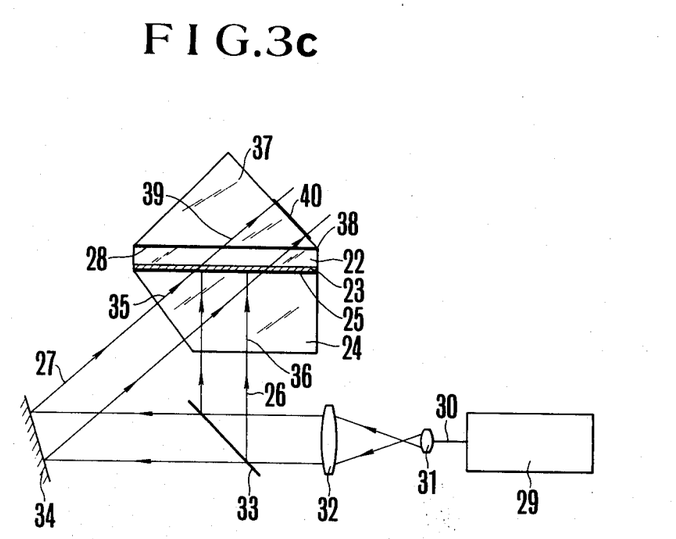
FIG. 3c shows the arrangement of the diffraction means.

An embodiment of diffracting gratings of three dimensional construction appears in FIG. 3c. This drawing includes a totally reflecting arrangement 22 provided with diffraction gratings, a light sensitive layer 23, an auxiliary prism 24 for forming diffraction gratings, a substance 25 which has the almost same refractive index as that of the totally reflecting arrangement or the auxiliary prism, such as liquid, a is the laser oscillator 29, and a second auxiliary prism 37. As is shown in the drawing, one surface of the totally reflecting arrangement 22 is covered with a light sensitive layer 23, which contacts the prism 24. At this time the optical contact state can be obtained when the totally reflecting means 22 is brought into contact with the prism 24 through a liquid whose refractive index is almost the same as those of the above members.

Two light beams 26 and 27 which interfere with each other strike the film 24 through the above arrangement. The beam 27 is directed to the totally reflecting surface 28 of the totally reflecting arrangement 22 so as to strike the prism 24 at an angle chosen to fulfill the total reflection conditions when the totally reflecting surface 28 is in contact with the outside substance such as air. Further, the mutually interfering two light beams 26 and 27 are produced when the beam 30 emitted from the laser 29 is enlarged with optics composed of the lenses 31 and 32, divided by means of the beam splitter 33 and reflected by the mirror 34. Hence, the light beams 35 and 36 incident upon the prism 24 reach the light sensitive layer 23 so as to form an interference fringe 42 in the light sensitive layer as is shown in FIG. 3d.

By developing and treating this light sensitive layer a totally reflecting arrangement 22 having a three dimensional diffraction grating can be obtained.

It is possible that the light beam 35 be totally reflected by the totally reflecting surface 28 and again reach the light sensitive layer. This is undesirable. In order to avoid such undesired light, the totally reflecting surface 28 is provided with a coating that prevents a total reflection. As shown in FIG. 3c a second auxiliary prism 37 reaches contact with the totally reflecting surface 28 through a liquid 38 in such a manner that the light beam 39 entering the auxiliary prism 37 is absorbed in a coating provided on the inclined surface 40 of the prism 37. Alternatively a reflection prevention coating is provided on the inclined surface 40 so as to lead the light beam 39 out of the prism 37.

Figure 3D:
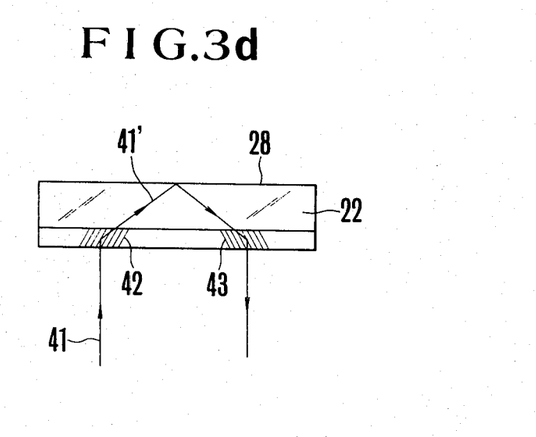
FIG. 3d shows another embodiment of the diffraction means.

In the totally reflecting member 22 thus manufactured, when a light beam 41 strikes the member 22, as shown in FIG. 3d, from substantially the same direction as the light beam 26 in FIG. 3c, diffracted light 41' travels along virtually the same direction as the light beam 35. This light is totally reflected by the surface 28. In the above embodiment the diffraction grating has a three dimensional construction so that most of the incident light beam 41 is transmitted in the direction of the 0 order diffracted light and the + first order diffracted light, while very little − first order diffracted light is transmitted. Hence, the amount of light is only slightly decreased.

Further, if a light beam is obtained from the totally reflecting member, it is possible to provide a diffraction grating having an inclination almost symmetrical to that of the diffraction gratings 42 having a three dimensional construction. According to an embodiment of the invention, a light sensitive layer used for forming this kind of diffraction grating, is a light sensitive layer of phase type such as a photoresistor, photopolymer, etc.

The intermediate adapter device in accordance with the present invention is intended to be used together with the diffraction arrangement explained above.

Figure 4A:
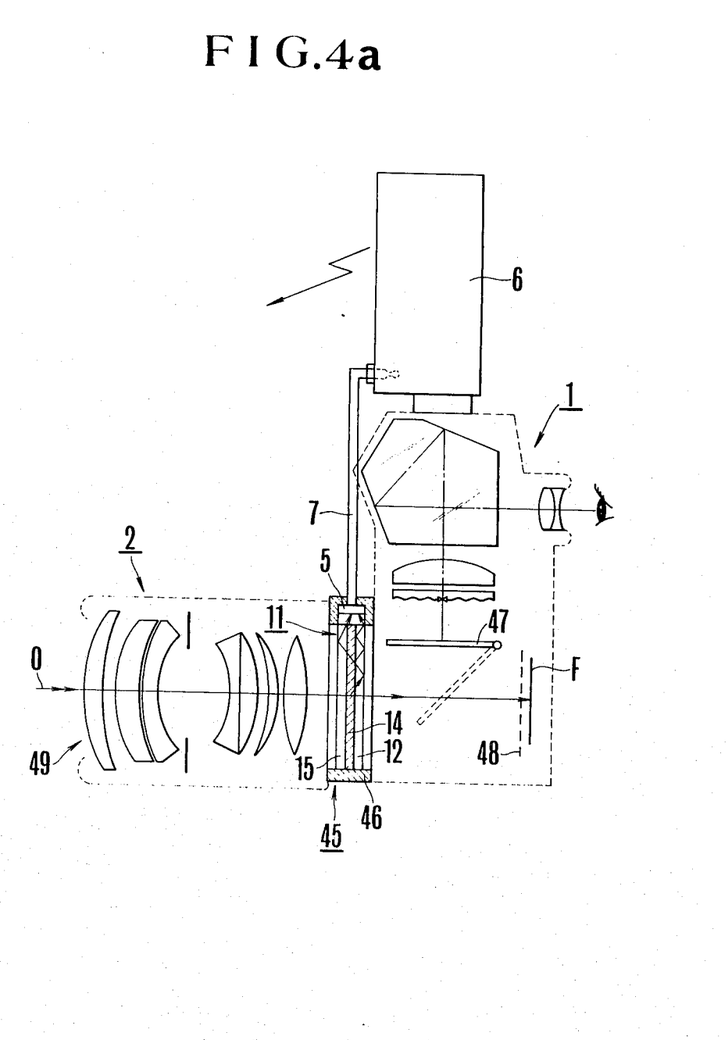
FIG. 4a shows the first embodiment of the intermediary adapter device in accordance with the present invention mounted on a camera.
Figure 4B:
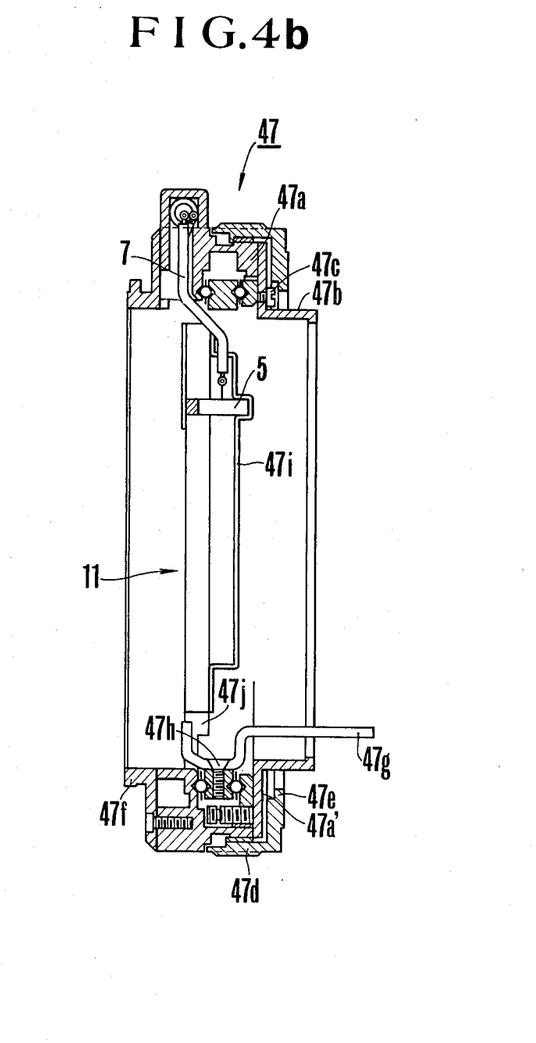
FIG. 4b shows the construction of the intermediate adapter device.

FIG. 4a shows an embodiment of the present invention mounted on a camera. The construction of the intermediate adapter device 47 is shown in FIG. 4b. A cylindrical housing 47a of the adapter device 47 forms an opening which provides an optical path. The end of the housing 47a which is coupled to the camera terminates in a cylindrical projection 47b that guides the adapter device into engagement with the camera. At the same end, a standard mounting surface 47a' is provided with a positioning pin 47c for positioning the adapter device C' relative to the camera. A cylindrical securing member 47d holding the circumference of the housing 47a forms engaging means or a bayonet ring 47e which grasps a suitable mount on the camera.

Opposite the projection 47b, on the housing 47a an engaging means or coupling mount 47f is secured with screws for engaging the interchangeable lenses. The mount 47f is provided with positioning means (not shown in the drawing) for positioning the photographing lens 2. An operative engaging member 47g maintains the operative engagement of the exposure control arrangement between the interchangeable lens 2 and the camera 1. The operative engaging member 47g is secured on an operative engaging ring 47h which is rotatably held in the housing by means of ball bearings by means of screws. One end of the member 47g extends to engage the camera's operative engaging member (not shown in the drawing) which is itself operatively engaged with the camera's exposure control mechanism (not shown in the drawing). The other end of the member 42 is constructed to engage the member for operating the diaphragm device (not shown in the drawing) in the interchangeable lens. A holding frame 47i holds the light beam splitter 11 and is itself secured in the housing by means of a securing frame 47j.

Figure 8:
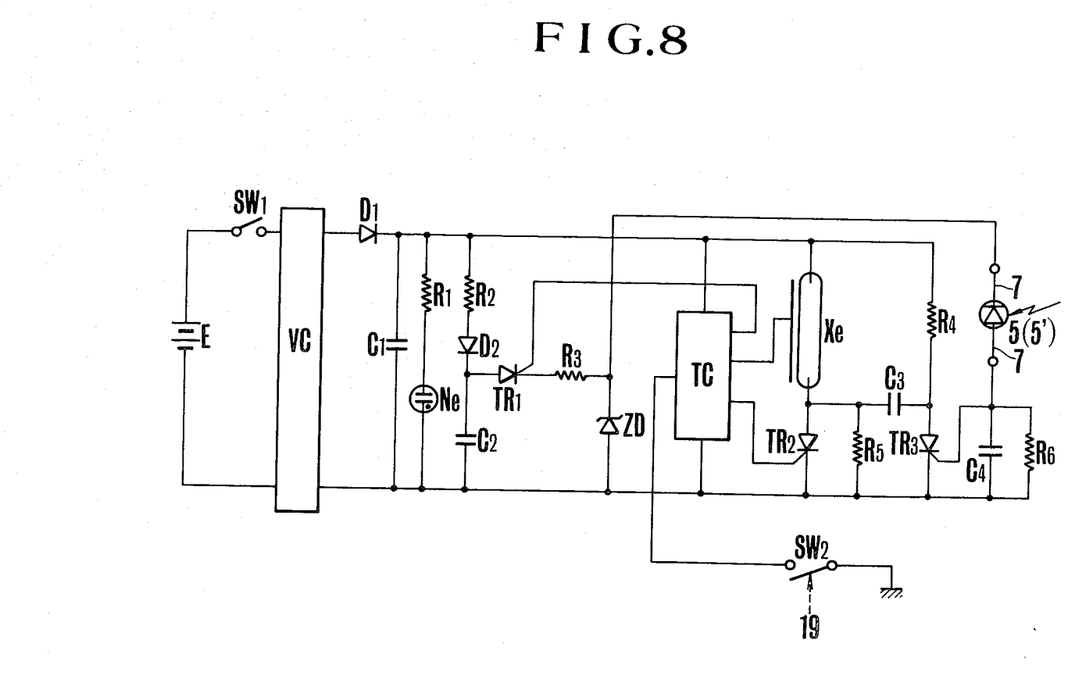
FIG. 8 shows an embodiment of the circuit of the speed light device to be used with the embodiment of the intermediary adapter device shown in FIGS. 4 to 6.

The light sensing element 5 is held on the holding frame 47i by a spacer and positioned so that a part of the light beam can be picked up from the image forming optical system and measured as is explained in accordance with FIG. 2 and FIGS. 3a to d. The connecting line 7 is connected to the light sensing element 5 at one end, kept at a line holding section formed at a part of the housing 47a and led out of the adapter device at the other end. The line 7 forms a coupler to be connected to the input of a light adjusting circuit (FIG. 8).

The thus constructed intermediate adapter 47, is, as is shown in the drawing, placed between the camera body 1 and the photographing lens 2. In consequence, the light sensing element 5 receives the light split by means of the light beam splitter out of the photographing light coming through the photographic lens 2, while the light sensing element 5 is connected to the light adjusting circuit in the flash unit 6 through the connecting line 7. In the above-mentioned combination the flash unit 6 is activated to illuminate the object when the shutter 48 has been totally opened after the quick return mirror 51 has been moved from the position shown by broken lines to the position by solid lines along the camera release operation. Light from the object then enters the camera through the photographic optical system 49. This light reaches the light beam splitter 11 in the intermediate adapter device 47, and a part of the light is diffracted by the diffraction grating pattern 14 in the light beam splitter 11 and passes out through the upper end surface of the light beam splitter 11 as is explained with respect to FIG. 3a. The light going out through the upper end surface of the light beam splitter 11 reaches the light sensing element 5. In accordance with the resulting output of the light sensing element the light adjusting circuit in the flash unit 6 operates so as to control the amount of the light emitted thereby. On the other hand, the light passing through the light beam splitter 11 reaches the film F so as to expose it.

The value of the diaphragm in the conventional photographic lens, the conventional lens value by an aperture value preset ring. Along the operation of the above-mentioned quick return mirror by means of the camera release operation, the operative engaging member in the camera operates the operating member in the photographic lens through the operative engaging member 47g in the adapter device so as to drive the diaphragm to the preset aperture value.

Namely, this embodiment of the intermediate adapter device has a positioning arrangement at both the surface to be connected to the photographic lens 2 and to the camera 1. The operative engagement of the camera 1 with the photographic lens 2 is smoothly controlled by the operative engaging member 47g.

Figure 5:
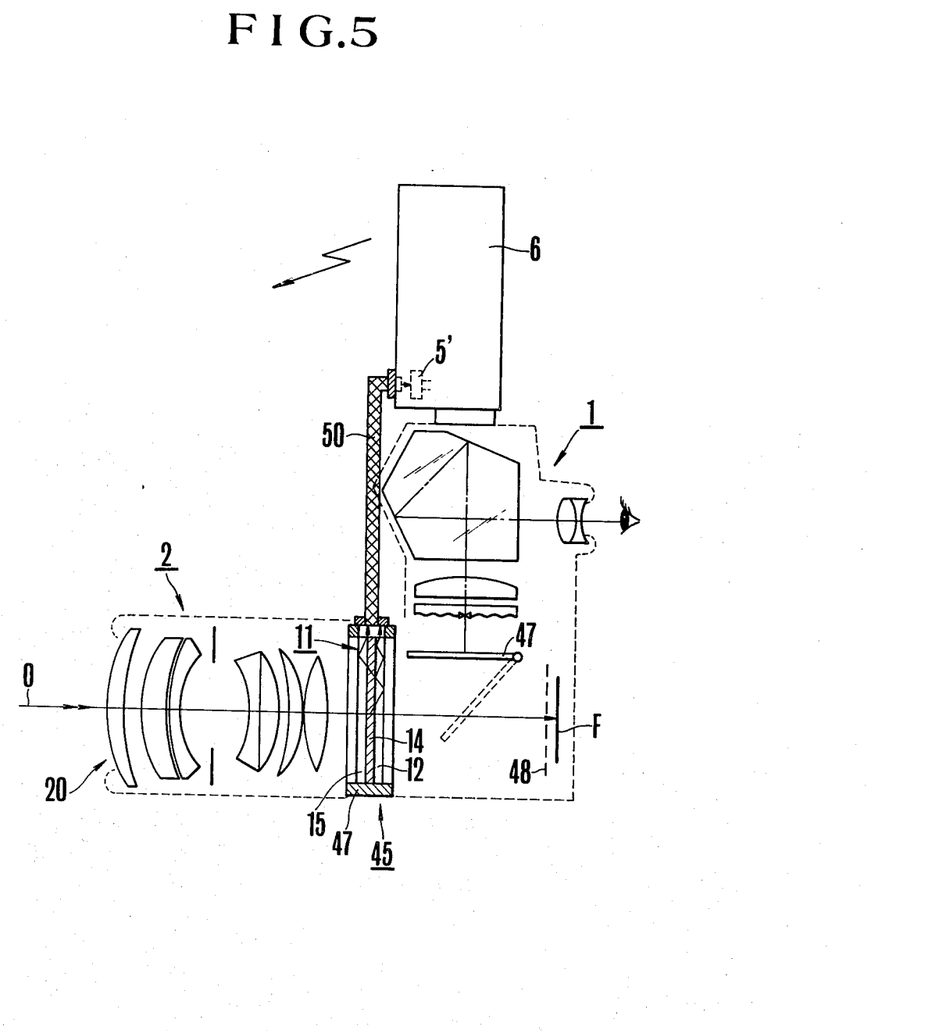
FIG. 5 shows the second embodiment in accordance with the present invention mounted on a camera.

FIG. 5 shows an embodiment in which the light sensing element 5 and the connecting cord 7 in the construction shown in FIG. 4 is replaced by a light beam transmitting member 50 such as optical fiber cable and a light sensing element 5'. The member 50 directs the light going out through the end surface of the light beam splitter 11 to the light sensing element 5' which is built in the flash unit 6. Hence a part of the photographing light picked up by means of the light beam splitter 11 is led to the light sensing element 5' in the flash unit 6 through the light transmission member 50.

Figure 6:
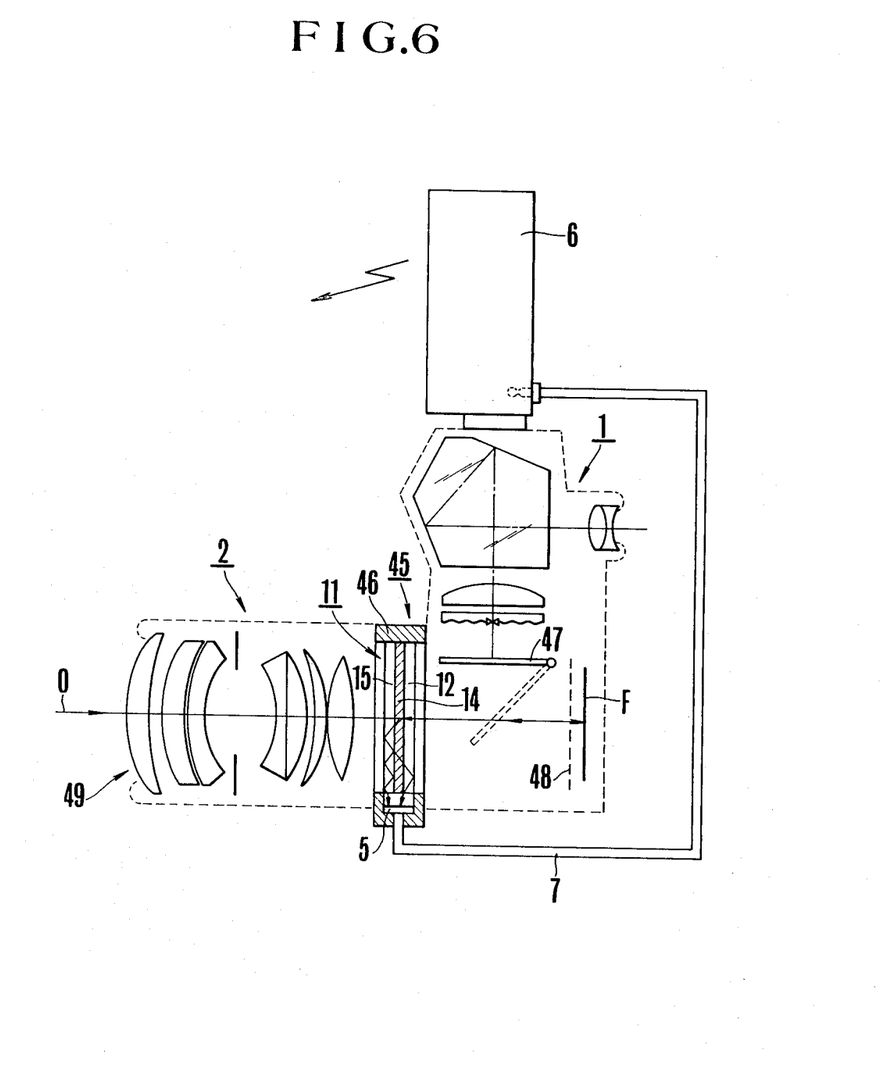
FIG. 6 shows the third embodiment in accordance with the present invention mounted on a camera.

FIG. 6 shows an embodiment in which a part of the light reflected on the film plane is used for the light measurement. In contrast to FIG. 4, the light sensing element 5 in FIG. 6 is arranged so as to receive the light coming out of the lower end surface of the light beam splitter 11. In this case the diffraction grating pattern has the same construction as that of the case shown in FIG. 4, while the light beam splitter itself is arranged in the same way. Consequently, the photographic light coming through the photographing optical system 49 and diffracted by the beam splitter 11 goes out through the upper end surface of the light beam splitter 11 and never reaches the light sensing element 5 provided at the lower edge. The light passed by the beam splitter 11 reaches the film F, is reflected thereby, and again reaches the light beam splitter 11 from the reversed direction. Thus, a part of the light reflected by the film surface is picked up by means of the diffraction effect of the diffraction grating pattern 14, goes out through the lower end surface of the light beam splitter 11 and reaches the light sensing element 5 so as to be measured there. The portion of the photographic light coming through the photographic optical system 49 and diffracted by the light beam splitter 11 toward the upper end surface may reach the light sensing element 5 due to the reflection of the internal surface. Hence, according to an embodiment, the internal surface of the ring 46 is treated so as to be light absorbent. Although not explained with respect to FIG. 4, but as can be understood from FIG. 6, a part of the light reflected by the film F and reaching the light beam splitter 11 may be diffracted toward the lower edge of the light beam splitter 11 and then reflected upward so as to reach the light sensing element 5 and cause an error in the light measurement. Hence, according to an embodiment of the invention, the internal surface of the ring 46 is also treated so as to be light absorbent.

Figure 7:
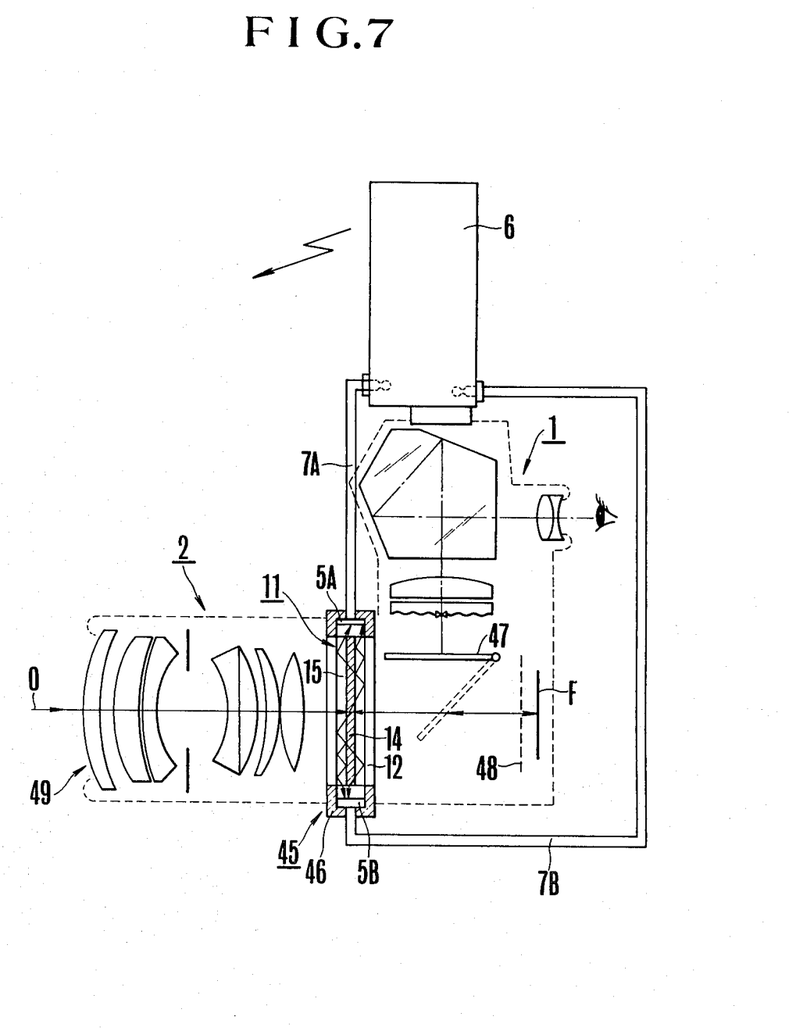
FIG. 7 shows the fourth embodiment of the present invention mounted on a camera.

FIG. 7 shows an embodiment in which part of the photographic light coming through the photographic lens and part of the light reflected on the film plane are used as the light for measurement. Here, a first light sensing element 5A is arranged to receive the split light from the upper end surface of the light beam splitter 11, while the second light sensing element 5B is arranged to receive the split light from the lower end surface of the light beam splitter 11. Both of the light sensing elements 5A and 5B are connected to the light adjusting circuit in the speed light device 6. In this case the diffraction grating pattern 14 is the same as in the embodiments shown in FIGS. 4a to 6, while the light beam splitter 11 itself is arranged the same way. As can be understood from FIGS. 4a and 6 the photographic light coming from the photographic optical system 49 is measured by the first light sensing element 5A, while the light reflected from the film F is measured by the second light sensing element 5B.

According to another embodiment of the invention, the light sensing elements 5, or 5A and 5B, shown in FIGS. 6 and 7 are mounted in the same way as in element 5 in the embodiment shown in FIG. 5. The intermediate adapter device 47 is then provided with the light transmission member (21) instead of the light sensing elements 5 or 5A and 5B, and the connecting cords 7, or 7A and 7B, so as to direct the light to be measured to the light sensing elements 5, or 5A and 5B in the speed light device 6 through the light transmission member.

FIG. 8 shows the construction of the automatically adjusting speed light device, suited for the embodiments shown in FIGS. 4a to 6. The device includes a power source E, a power source switch $SW_1$, a voltage step up circuit VC, a rectifying diode $D_1$, a main condenser $C_1$ for storing the charge, a resistor $R_1$ and neon tube for displaying completion of the charge. Resistors $R_2$ and $R_3$, a diode $D_2$, a capacitor $C_2$, a thyristor $TR_1$ and a constant voltage diode ZD form a generator circuit for for producing a constant voltage for a predetermined time, in which voltage is to be applied to the light detecting and adjustment circuit composed of the light sensing element 5 (5'), the resistance $R_6$ and the condenser $C_4$. A Xenon tube Xe, a trigger circuit TC, thyristers $TR_2$ and $TR_3$, resistors $R_4$ and $R_5$, and a capacitor $C_3$ form a light emission stop circuit. A synchronization contact switch $SW_2$ is to be closed at the time the shutter 19 has been totally opened.

With the above construction, when the camera release is carried out while the main capacitor $C_1$ is charged, the synchronization contact switch $SW_2$ is closed during the total opening of the shutter 19, and the trigger circuit TC is closed. The thyristor $TR_2$ is switched on to start the flash of the Xenon tube Xe and illuminate the object. At this time firing of the thyristor $TR_1$ causes the charge stored in the capacitor $C_2$ to flow through the constant voltage diode ZD so that the constant voltage then produced across the constant voltage diode ZD is applied across the light detecting circuit consisting of the light sensing element 5(5'), the resistor $R_6$ and the capacitor $C_4$. The capacitor $C_4$ integrates the photo current through the light sensing element 5(5'). The latter senses either the light which the light beam splitter 11 directs to it from the photographic light in the photographing optical system 4a, or the light which the beam splitter 11 splits off from the light reflected by the film F. When the capacitor $C_4$ integrating the current from the constant voltage across diode ZD through the sensor 5(5'), produces a voltage, exhibits a voltage higher than a predetermined voltage, the thyristor $TR_3$ is switched on so that a current runs through the resistance $R_4$ and the capacitor $C_3$. This quenches the thyristor $TR_2$ because its anode potential is lowered. It stops the discharge of the Xenon tube XE and completes the automatic light adjustment.

Figure 9:
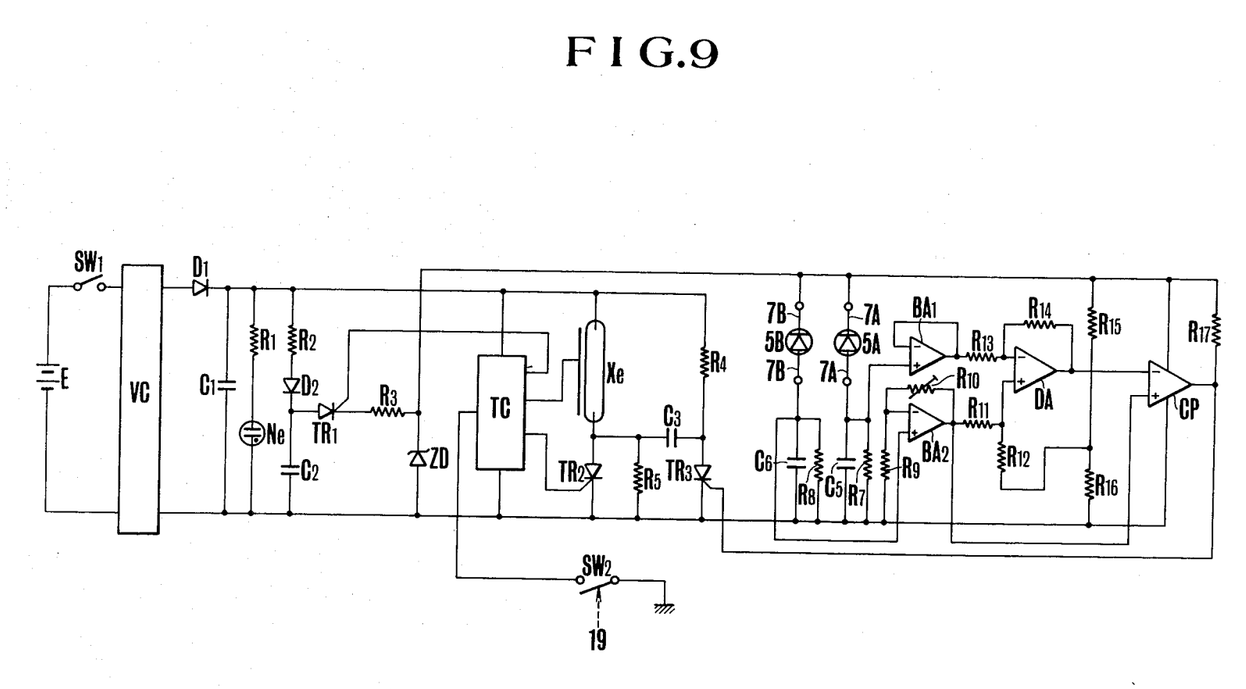
FIG. 9 shows an embodiment of the circuit of the speed light device so designed that when it is used with the embodiment of the intermediary adapter device shown in FIG. 7 the difference of the reflection factor of the film to be used can automatically be compensated at the time of the automatic light adjustment in accordance with the system for measuring the light reflected on the film surface.

FIG. 9 shows an embodiment of the speed light device from which a proper flash light emission can be obtained regardless of differences in the reflection index of the film. This is done by automatically compensating for the differences in the refraction index when the light is automatically adjusted on the basis of the film surface reflection by the light measuring system shown in FIG. 7. Members the same as those in FIG. 8 are designated by the same reference characters. Only the constructions different from those in FIG. 8 are explained. In FIG. 9, a resistor $R_7$ and a photo current integrating capacitor $C_5$ are provided for the first light sensing element 5A which serves for measuring the light from the photographic optical system 20. A resistor $R_8$ and a photo current integrating capacitor $C_6$ are provided for the second light sensing element 5B which measures the light reflected on the film F. These components are connected in the same way as the light sensing element 5(5'), the resistor $R_6$ and the capacitor $C_4$ shown in FIG. 8. They are to be supplied with a constant voltage, for a predetermined time from the constant voltage producing circuit composed of the resistors $R_2,R_3$, the diode $D_2$, the capacitor $C_2$, the thyrister TR and the constant voltage diode ZD during the light adjusting. A buffer amplifier BA, receives the voltage between the terminals of the photo current integrating capacitor $C_5$ of the first light sensing element 5A. A buffer amplifier $BA_2$ receives the voltage between the terminals of the photo current integrating capacitor $C_6$ of the second light sensing element 5B. The inverting input of a differential amplifier DA receives the output of the buffer amplifier $BA_1$ and the non-inverting input receives the output of the buffer amplifier $BA_2$ and the potential ES at the voltage dividing point of the resistances $R_{15}$ and $R_{16}$ in such a manner that the difference between the two outputs is produced. A comparator CP has an inverting input which receives the output of the differential amplifier DA and a non-inverting input which receives the output of the buffer amplifier $BA_2$ in such a manner that the both outputs are compared with each other. The output of the comparator CP is delivered to the gate of the thyrister $TR_3$. The circuit includes resistors $R_9$ to $R_{14}$.

In the above arrangement, when the camera's shutter release produces flash emission of the Zenon tube Xe, a first voltage $V_{10}$ occurs across the terminals of the capacitor $C_5$ which integrates the output current of the light sensing element 5A that measures the light from the optical system 20. A second voltage $V_{20}$ occurs and the latter corresponds to the sum of the voltage across the terminals of the capacitor $C_6$ that integrates the output current of the light sensing element 5B which measures the light reflected on the film F and the voltage divided by means of the resistors $R_{15}$ and $R_{16}$. When the differences between the voltages $V_1$ and $V_2$ becomes higher than that across the terminals of the capacitor $C_6$, the output of the comparator CP goes high so as to switch on the thyrister $TR_3$ and stop the light emission of the Xenon tube Xe. Now, let $VBA_1$ be the output voltage of the buffer amplifier $BA_1$ which responds to the voltage between the terminals of the capacitor $C_5$, $VBA_2$ the output voltage of the buffer amplifier $BA_2$ which responds to the voltage between the terminals of the capacitor $C_6$ and let the values of the resistors $R_{11}$ to $R_{14}$ be equal to each other. Then the output voltage VDA of the differential amplifier DA is represented by $$VDS - VBA_2 + Es - VBA_1.$$

Now, the resistances $R_9$ and $R_{10}$ are adjusted in such a manner that $VBA_1 = VBA_2$ when the film most generally used (whose reflection index is $\nu_1$) is used.

(1) If the film whose reflection index is $\nu_1$ is used, $VDA = Es$ and $VBA_1 = VBA_2$ in such a manner that the trigger level of the comparator CP is set at the voltage Es. Hence the output of the comparator CP goes high when the output voltage $VBA_2$ of the buffer amplifier $BA_2$ which produces the signal for measuring the light reflected on the film surface, reaches Es. This occurs at the time $t_1$ in FIG. 10 and the Xenon tube Xe stops the light emission.

(2) Where film whose reflection index $\nu_2$ is higher than $\nu_1 (\nu_2 < \nu HD\ 1)$ is used, it is necessary that the trigger level of the comparator CP be adjusted. That is its trigger level must be increased by a vlaue corresponding to the difference between the output voltage VBA₂(A) of the buffer amplifier BA₂ and that of VBA₁ of the buffer amplifier BA₁ which produces the signal for measuring the photographing light, i.e. the difference (VBA₂(A)−VBA₁). This is needed in order that a constant amount of flash light be obtained regardless of the difference of the reflection indices of the film, because the output voltage VBA₂ of the buffer amplifier BA₂ is increased in the level as shown with VBA₂(A) in FIG. 10. In this case the output voltage VDA of the differential amplifier DA that produces the trigger level of the comparator CP is represented as follows:

$$VDA = VDA(A) = E_s + VBA_2(A) - VBA_1.$$

Figure 10:
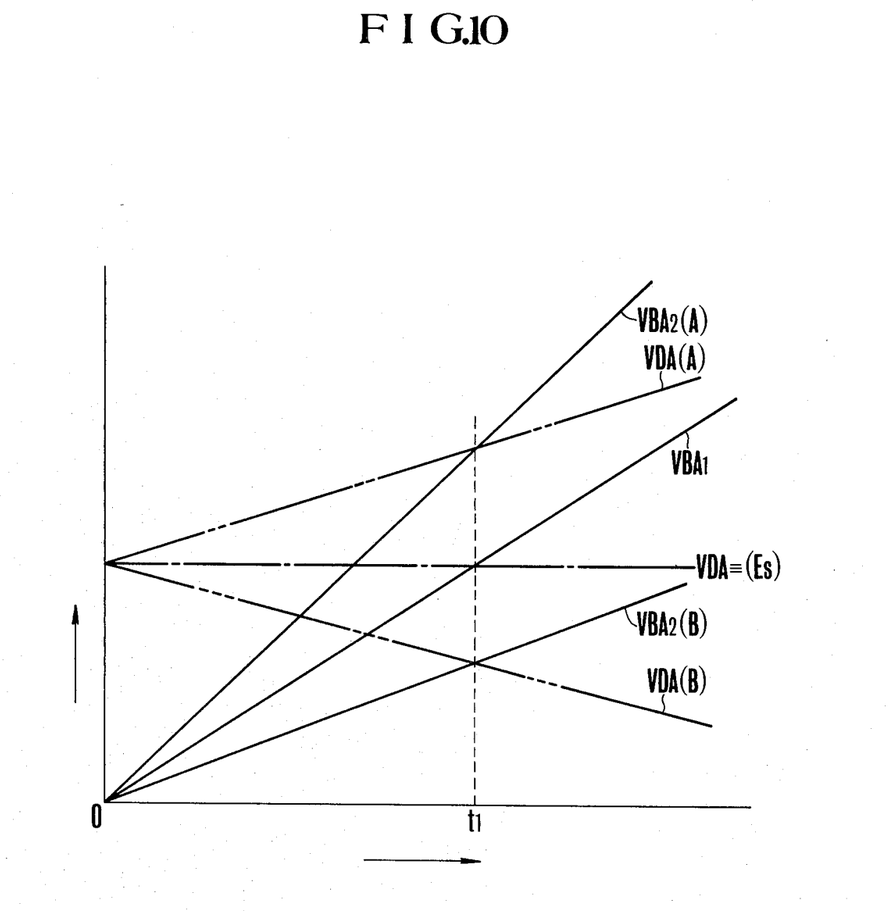
FIG. 10 shows the output characteristics for explaining the operation of the speed light device shown in FIG. 9.

Thus the trigger level of the comparator CP is adjusted by the difference of the reflection index of the film then used ($v_2 - v_1$) in such a manner that in the same way as in the case of (1) at the time point $t_1$ in FIG. 10 the output of the comparator CP becomes high and stops the flash light emission of the Xenon tube Xe.

(3) If the film whose reflection index $v_3$ is lower than $1 (v_3 < v_1)$ is used, it is necessary that the trigger level of the comparator CP should be adjusted, namely lowered. Particularly it must be lowered by a value corresponding to the difference between the output voltage VBA₂ of the buffer amplifier BA₂(B) and the output voltage VBA₁ of the buffer amplifier BA₁(VBA₁−VBA₂(B)) in order that a constant amount of flash light be obtained regardless of the difference of the reflection index of the film because the output voltage VBA₂ of the buffer amplifier BA₂ is lowered in the level as is shown with VBA₂(B) in FIG. 10. In this case the output voltage VDA of the differential amplifier DA as the trigger level of the comparator CP is represented as follows:

$$VDA = VDA(B) = E_s + VBA_2(B) - VBA_1.$$

Thus, the trigger level of the comparator CP is adjusted by the difference of the reflection index of the film then used ($v_3 - v_1$). This is done so that in the same way as in case (1) the output of the comparator CP at the time $t_1$ in FIG. 10 goes high so as to stop the flash light emission of the Xenon tube Xe.

In this way the combination of the intermediate adapter device shown in FIG. 7 with the speed light device shown in FIG. 9 automatically adjusts for the difference of the reflection index of the film then used is during the light adjustment. Hence a proper exposure can always be obtained regardless of the difference of the reflection index of the film then used, which is quite profitable.

As explained in detail in accordance with the present invention, the total length of the intermediate adapter with a light beam splitter to be placed between the camera body and the photographic lens can be substantially reduced in comparison with conventional adapters. Hence not only is the application field for close-up photography increased but also the adapter device itself can be constructed as a very compact camera accessory.

Although the disclosed embodiments of the present invention describe a type of adapter placed between an interchangeable lens and the camera 1 for directing a part of the light out of the photographic optical path by a diffraction grating, it is also possible to use other types of adapters. Namely, it goes without saying that it is possible to arrange the adapter device 45 in the photographic optical path of the interchangeable lens 2 or the camera body 1, and the adapter device 45 can be built in the barrel of the interchangeable lens, as a unit.

What is claimed is:

1. A photographic system, comprising:
    (A) a camera body, a flash mountable on the body, flash means, a photographic lens defining an optical path from the lens to a light sensing surface,
    (B) an adapter, including:
        (a) a diffraction element in the optical path for directing a part of the light out of the optical path;
        (b) a housing for holding the diffraction element and for mounting or dismounting the diffraction element in or out of the optical path, said housing being arranged on the photographic optical path between said camera body and said photographic lens;
        (c) first conversion means for receiving light coming from the object and directed out of the optical path by the diffraction element so as to convert the light into an electrical signal on the basis of the amount of the received light; and
        (d) second conversion means for receiving a part of the light having passed through the diffraction element, reflected on the light sensitive surface and directed out of the optical path by means of the diffraction element so as to convert it into an electrical signal on the basis of the amount of light received, and
    (C) said flash means including means for correcting the amount of flash which receives signals from said first conversion means and said second conversion means and corrects the amount of flash of said flash means in correspondence to the signal from said second conversion means.

2. A camera system comprising:
    (a) a camera body;
    (b) a photographic lens;
    (c) an intermediate adapter arranged between said camera body and said photographic lens, said intermediate adapter having:
        (c1) a light directing means arranged in a photographic optical path;
        (c2) first light receiving means for receiving a light beam directly from an object through the light directing means;
        (c3) second light receiving means for receiving a light beam reflected on a film surface through the light directing means, and
    (d) flash means for controlling the amount of flash in correspondence to the object brightness and the film used, said flash means being arranged for receiving signals from said first light receiving means and the second light receiving means to generate a correction signal in correspondence to the film used to control the amount of flash.

* * * * *